C. E. ECKRODE.
PNEUMATIC RUBBER TIRE.
APPLICATION FILED MAR. 2, 1910.
999,157.
Patented July 25, 1911.
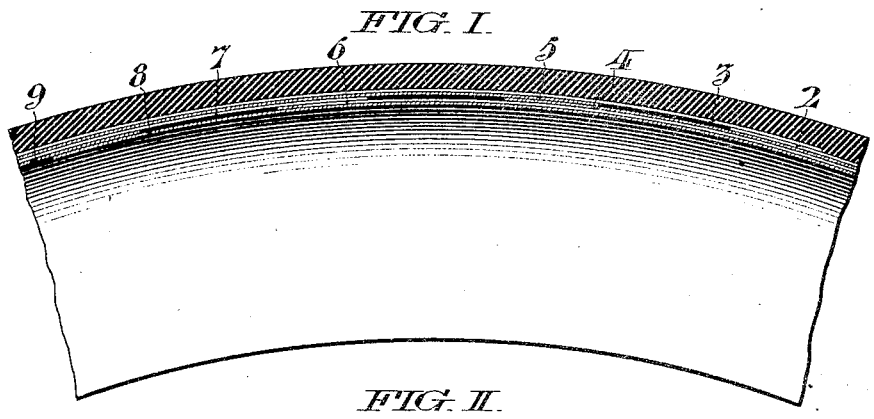
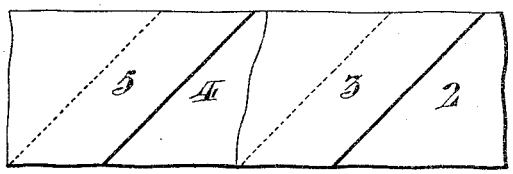
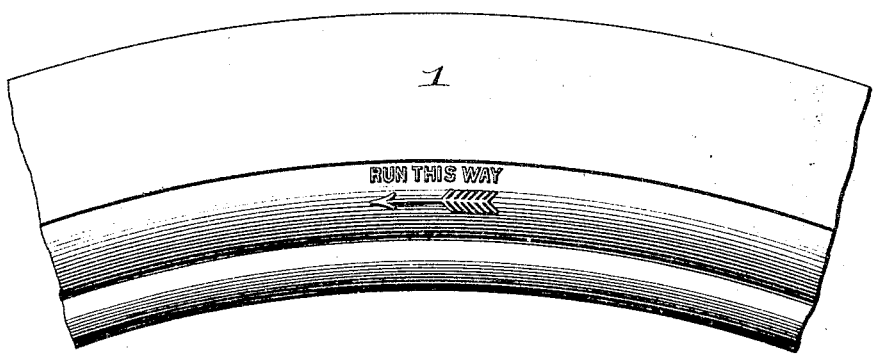
Witnesses
John C. Bergner
James K. Bell
Inventor
Clement E. Eckrode,
by Tracy & Paul
Attorneys

UNITED STATES PATENT OFFICE.

CLEMENT E. ECKRODE, OF CONSHOHOCKEN, PENNSYLVANIA, ASSIGNOR TO J. ELLWOOD LEE COMPANY, OF CONSHOHOCKEN, PENNSYLVANIA, A CORPORATION OF PENNSYLVANIA.

PNEUMATIC RUBBER TIRE.

999,157.      Specification of Letters Patent.    Patented July 25, 1911.

Application filed March 2, 1910. Serial No. 546,771.

*To all whom it may concern:*

Be it known that I, CLEMENT E. ECKRODE, of Conshohocken, in the county of Montgomery and State of Pennsylvania, have invented certain new and useful Improvements in Pneumatic Rubber Tires, whereof the following is a specification, reference being had to the accompanying drawings.

My invention relates to rubber tires in which stout woven fabric, such as canvas, cut in strips, is embedded within a mass of rubber. In such tires in order to make the fabric properly conform to the shape of the tire, it is cut in strips of moderate length, which lie in succession around the tire, the end of each strip overlapping the end of the strip preceding it, somewhat in the manner of shingles upon a roof, the overlaps always lying in the same relation to each other. Hitherto, such tires have been applied to the wheels of the vehicles upon which they are to be used indiscriminately as regards any relation between the overlaps of the fabric, and the direction in which the wheel normally turns; for such tires are usually symmetrical, and therefore reversible in position, and it has never been known that the direction of rotation had any relation to the proper performance by the tire of its functions. But, I have discovered by a series of experiments that a rubber tire of the character described, is capable of withstanding usage for a much longer period, if it is applied to the wheel in such manner that the direction in which successive strips of fabric overlap each other at their ends has a definite relation as herein described, to the direction in which the wheel normally turns. In order to render this discovery useful in the arts, it is essential that there be placed upon the visible surface of the tire a direction mark, having relation to the way in which the fabrics which are embedded within the tire, and which are therefore invisible, are overlapped; since otherwise one applying the tire to a wheel cannot know in which direction it ought to be applied in order to utilize the valuable discovery upon which my present invention is based.

Accordingly my invention as described and claimed consists in the combination of a tire of the character described, with an external mark upon its visible surface, having relation to the internal structure thereof, and sufficiently indicating to one proposing to mount the tire upon a wheel, in which direction it should be applied in order to secure the increased life of the tire which may be obtained by applying it in accordance with my invention.

In the accompanying drawings, Figure I, is a longitudinal section of a tire of the character to which my invention is applicable. Fig. II, is a partial development of the surface with parts torn away to exhibit the structure. Fig. III, is an external view of a portion of such a tire having on it a mark of the character sufficient to accomplish the purpose of my invention.

Fig. I, represents a clencher tire with the central part of its periphery exhibited in section. The outer portion 1, of the tire is usually of pure rubber, while upon the inner part it is reinforced by successive layers of canvas or other similar stout woven fabric. This fabric is in strips of moderate length, usually several being required to completely encircle the tire once, and these strips successively overlap at their ends, usually in a diagonal direction, as shown in Fig. II. The overlaps are all made in a definite direction, thus in Figs. I, and II, the end of strip 2, is overlapped by the adjacent end of strip 3. The end of strip 4, is overlapped in the same direction by the end of strip 5. And the same is true of the overlaps of strips 6, and 7, and of strips 8, and 9. When the tire is completed the canvas portions and therefore the overlaps are hidden in the structure. But I have found that in use the life of this structure is much prolonged if the tire is so applied to the wheel as to normally run in such direction that the weight of the vehicle constantly passes from an overlapping strip to an overlapped strip, as distinguished from the reverse condition. I account for the fact by supposing an internal diagonal strain which, if occurring in one direction constantly, tends to separate the overlaps, but do not base my invention upon such theoretical considerations. In order to render this discovery useful, since the internal structure of the tire is invisible, I place upon the visible exterior of the tire, a directional mark, having definite relation to the way in which the fabric strips are overlapped, and preferably consisting of an arrow pointing the way in which the tire as applied to the wheel, should turn. For example, in Fig. III, an arrow is permanently formed upon the rubber surface of the tire, to indicate the direction in which the tire should turn, in order to accomplish the end I have described. But it is evident that other marks indicating either the direction in which the wheel should turn, or the direction in which the canvas strips are overlapped, would answer the same purpose, and are within the scope of my invention.

Having thus described my invention, I claim:—

A rubber vehicle-tire containing embedded within its structure strips of fabric which overlap at their ends successively in the same direction, and which has applied to its visible surface a permanent mark having definite relation to the direction in which said strips are overlapped, and capable of indicating the way in which the tire should be applied to cause the weight of the vehicle to normally pass constantly from an overlapping to an overlapped strip.

In testimony whereof, I have hereunto signed my name, at Philadelphia, Pennsylvania this first day of March 1910.

CLEMENT E. ECKRODE.

Witnesses:
JAMES H. BELL,
E. L. FULLERTON.